INVENTOR.
Edwin W. DeKoning

June 1, 1954 — E. W. DE KONING — 2,679,919
LUMBER TRANSFER MECHANISM
Filed March 15, 1952 — 3 Sheets-Sheet 3
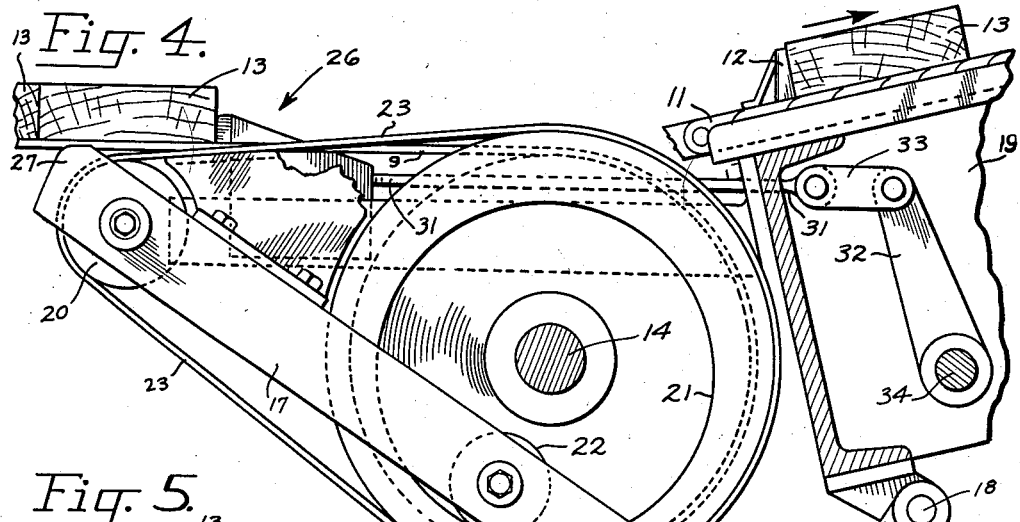
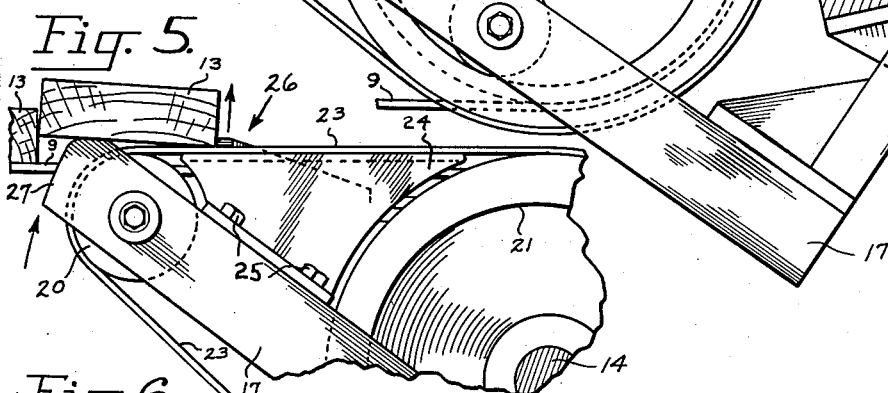
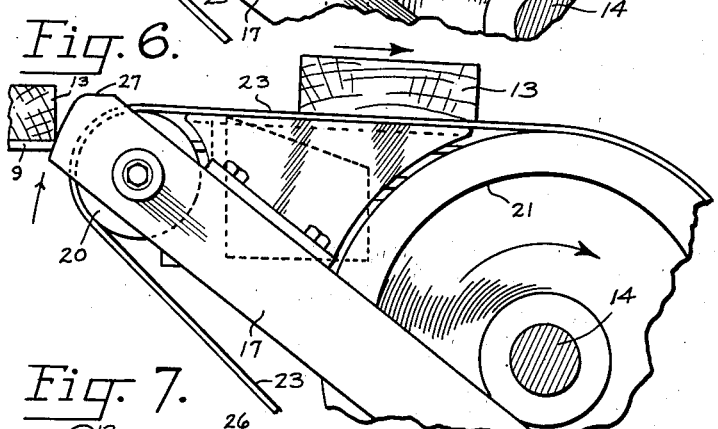
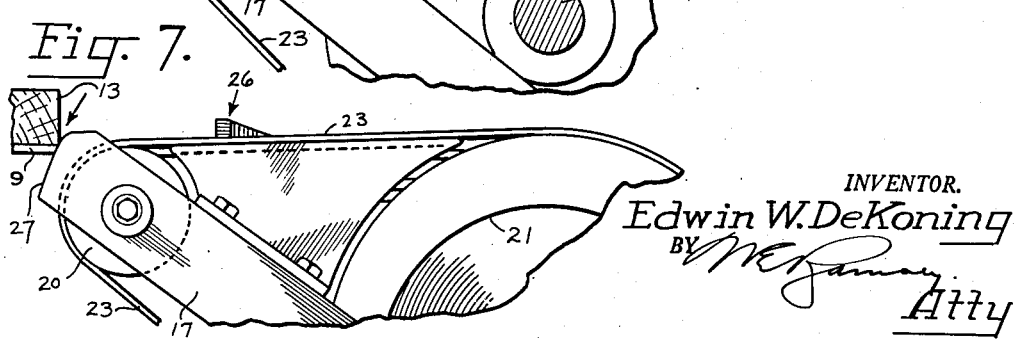
INVENTOR.
Edwin W. DeKoning
Atty Patented June 1, 1954

2,679,919

UNITED STATES PATENT OFFICE 2,679,919

LUMBER TRANSFER MECHANISM

Edwin W. De Koning, Portland, Oreg.

Application March 15, 1952, Serial No. 276,743

10 Claims. (Cl. 198—34)

My invention relates to a lumber transfer mechanism having a correlated stop mechanism, lift bumper and conveyor belt, respectively, for stopping, selecting, lifting and transferring boards to a point of use. More particularly, my lumber transfer mechanism may be used intermediate a continuous lumber feed chain and a trimmer saw lug chain. Thus, the feed chain functions continuously to pile up a number of boards in tight, edge to edge, abutment against the lumber transfer mechanism and the trimmer saw lug chain serves to move individual boards edgewise past a trimmer saw where the ends are squared and defective intermediate portions are cut out. When correlated to these two chains, my lumber transfer mechanism automatically stops the oncoming boards in an edge to edge pile, picks up the first board only from this pile, lifts this first board over a stop, and moves it edgewise toward the trimmer saw lug chain without disturbing the remaining boards. The cycle then repeats as desired.

One object of my invention is to provide a lumber transfer mechanism which thus will separate the leading board only from a plurality of edge to edge abutted boards and will move it to an end point of use without disturbing the remaining boards and without requiring manual control.

Another object of my invention is to provide an efficient lumber transfer mechanism which can be manufactured at a minimal cost yet which can be adjusted in size, readily and quickly on the job, so as to handle various sizes of boards and types of lumber.

In the production of lumber, at which the Pacific Northwest area of the United States leads all others, rough boards initially are cut to random lengths with the ends unsquared. To convert these boards to merchantable quality and to remove defective intermediate sections therefrom, the boards are trimmed to a preselected length, the ends are squared, and sections are cut out by a trimmer saw. These trimmer saws are of two types. An "automatic" trimmer saw is one which receives boards and squares the ends while trimming to an exact preselected length and a "selective" trimmer saw is one which, in addition to the above function, may be used simultaneously to remove defective intermediate sections such as large pitch pockets, broken sections, open knot holes, and the like.

In the present day, highly competitive state of the lumber industry, productive capacity and, hence, trimmer saw output capacity increasingly is becoming of critical importance. Thus, recent developments and improvements have so correlated the various operating structures in a trimmer saw that an automatic saw now can handle 85 to 90 boards a minute. Improved selective trimmer saws, on the other hand, now can handle 35 to 50 boards a minute. One such improved operating structure is disclosed in my copending application Serial No. 175,680, filed July 25, 1950 now Patent No. 2,661,778, and entitled Trimmer Saw. A second is disclosed in my copending application Serial No. 276,742, filed March 15, 1952, and entitled Selectable Latch for Trimmer Saw. Both of these improvements may be incorporated in a trimmer saw utilizing the transfer mechanism of the instant invention materially to increase the speed and capacity of the entire saw mechanism.

With a conventional trimmer saw, it heretofore has been the practice manually to transfer the boards to the lug feed chain. Thus, even today, a great majority of the lumber mills in the United States and Canada employ one man who does nothing but transfer boards from a feed chain to the trimmer saw lug chains. As is evident, however, the increased speed at which an improved trimmer saw can be operated surpasses the speed of manual loading and it is becoming increasingly difficult, if not impossible, for a single man to keep up with the lug chain. Accordingly, I have directed my inventive efforts toward the provision of an improved automatic lumber transfer mechanism which will replace manual loading and, thereby, will allow a modern improved trimmer saw mechanism to be operated at the high speeds for which it is designed.

In satisfaction of the above objectives, the instant invention provides both a power driven pulley wheel which is keyed to the trimmer tail shaft of the trimmer saw mechanism and an idler pulley wheel which is journaled on one end of an elongated lift arm. Additionally, the power wheel carries a cam surface and an intermediate portion of the elongated lift arm carries a cam follower for cooperation with the cam surface. The elongated arm, in turn, has one end pivotally mounted so that rotation of the power driven pulley wheel causes the cam surface thereof to coact with the follower and to move the free end of the lift arm and the idler wheel up and down.

In addition to the above mechanism, my invention provides a conveyor belt which is reeved over the power driven and the idler pulley wheels with the upper course of the belt arranged in substantial alignment with the lumber feed chain and the trimmer saw lug chain. At the end of the elongated lift arm, in turn, a bumper mechanism protrudes beyond the periphery of the idler wheel so that boards pushed forward by the feed chain must bump thereagainst rather than against the conveyor belt of the transfer mechanism. Furthermore, a stop mechanism is arranged off-bearing of the idler pulley wheel and in a position to protrude above the upper course of the conveyor belt when the transfer mechanism is in a "lower" position. However, when the transfer mechanism is in a "raised" position, the upper course of the conveyor belt lies above the stop mechanism and a board then may pass over the stop.

In use, the feed chain causes a number of boards to pile up in edge to edge abutment against the transfer mechanism with the leading board resting against the stop mechanism and with the bumper underlying this leading board. Thereafter, rotation of the large pulley wheel will cause the cam follower to pivot the elongated lift arm vertically upward. This upward movement causes the bumper to contact the under surface of the first board and, in accord with an important part of my invention, such contact takes place at a point located rearwardly of the center of gravity of the board. Continued upward movement then causes the bumper to lift the first board over the stop mechanism and onto the conveyor belt where it is passed to the trimmer saw lug chain. As the first board moves away, of course, the leading edge of the second board is moved ahead, by the feed chain, into abutment with the leading edge of the bumper. Thereafter, as the transfer mechanism is pivoted downwardly, the second board is crowded forwardly over the top of the bumper and up against the stop mechanism. Effectively, then, the transfer mechanism serves automatically to select or pick the first board away from the other abutting boards and to carry this first board to an end point of use without disturbing the remaining boards.

In conjunction with the above described lumber transfer mechanism, it is a further object of my invention to correlate the movements and the speed thereof to the movements and to the speed of a trimmer saw lug chain so that but one board at a time is deposited upon each single row of chain lugs.

Yet another object of my invention is to correlate the above described lumber transfer mechanism to both a continuous feed chain and a trimmer saw lug chain so that all three mechanisms may be powered from a common shaft and so the operating movements of the various mechanisms will be correlated to pick up, to transfer and to load lumber at a speed commensurate with the speed of the present day improved trimmer saw. These latter two objectives, of course, are aimed at an increased productive capacity and an increased profit for the lumber mill.

The above and other desirable objects, capabilities and advantages inherent in and encompassed by the lumber transfer mechanism of the present invention will become apparent from the ensuing description, taken in conjunction with the accompaying drawings, wherein.

Figure 2:
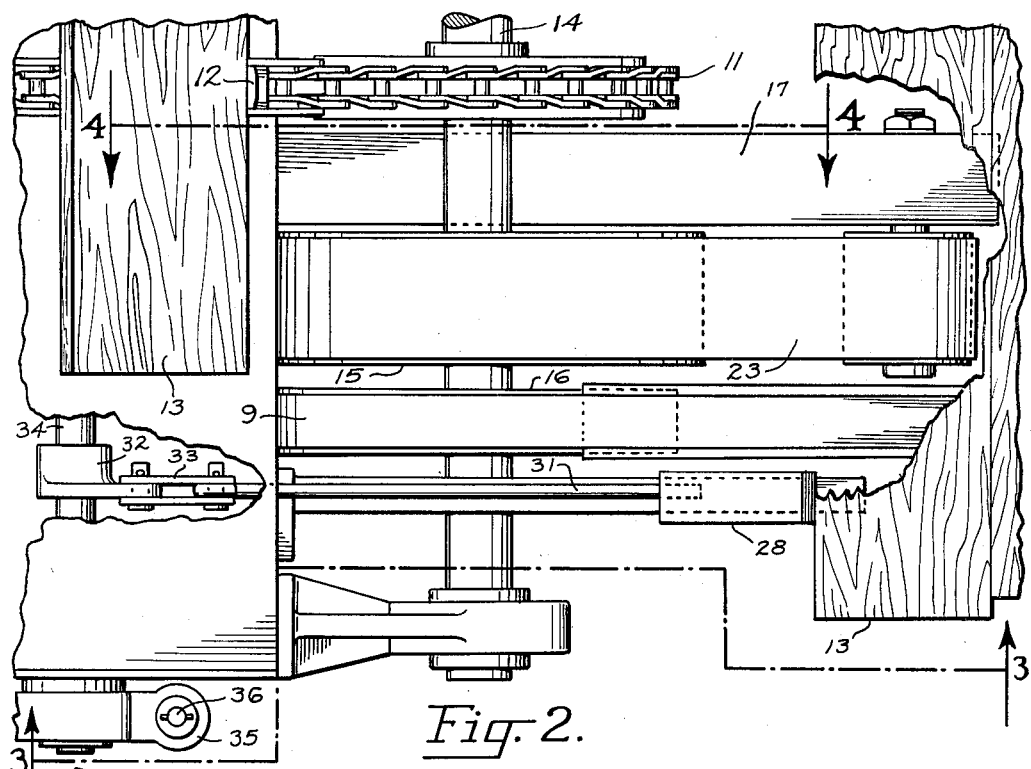
Fig. 2 is an enlarged top detail view, partially broken away, showing an individual unit of my lumber transfer mechanism constructed in accord with this invention.

Fig. 4 is a further side detail view, taken substantially on the line 4—4 of Fig. 2, and showing the operative relationship of the cam and follower means which interconnect the power wheel and the lift arm to raise and lower the free end of the arm as the power wheel rotates; and Figs. 5, 6, and 7 are correlated partial side views, taken substantially along the same line as Fig. 4, showing the lumber transfer mechanism and a series of boards in three successive positions during a typical cycle of operation.

Figure 1:
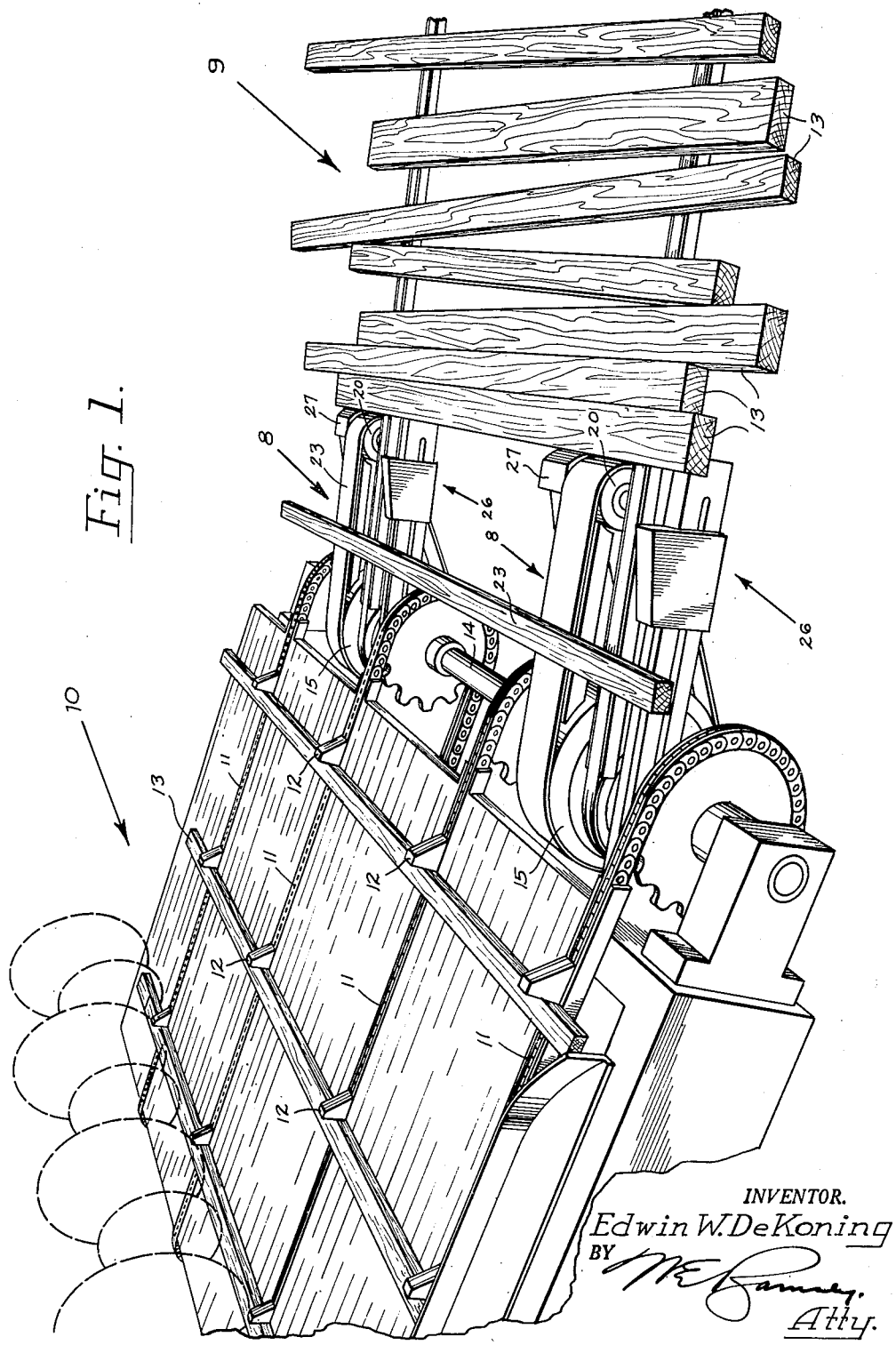
Fig. 1 is a perspective view of my lumber transfer mechanism as it appears when correlated (A) to a lumber feed belt system having a number of boards moving edgewise thereacross and piling up in tight edge to edge abutment and (B) to a trimmer saw lug chain having but one board carried by and positioned upon each row of lugs.

Fig. 1 is a perspective view wherein two lumber transfer mechanisms, generally indicated at 8, are correlated to a lumber feed belt system 9 and a trimmer saw mechanism 10. As is well known in the art, the trimmer saw mechanism includes a plurality of laterally spaced saws and rider wheels (indicated in dashed outline) and a plurality of feed chains 11 having lugs 12 thereon for moving one board at a time past the saws. Further, the feed belt system 9 is well known in the art and it functions to move a plurality of boards 13 edgewise toward the feed chain and lugs. Thus, Fig. 1 illustrates a preferred use of the inventive structure wherein the lumber transfer mechanism 8 functions to stop and then to transfer the boards 13, one by one, from the edge to edge pile on the feed belt system 9 to the row of lugs 12 on the chains 11. Heretofore, a majority of the nation's lumber mills have employed manual labor to accomplish this transfer function and a prime object of my invention is to replace this manual labor with a fully automatic mechanism which will operate faster and more efficiently.

Figure 3:
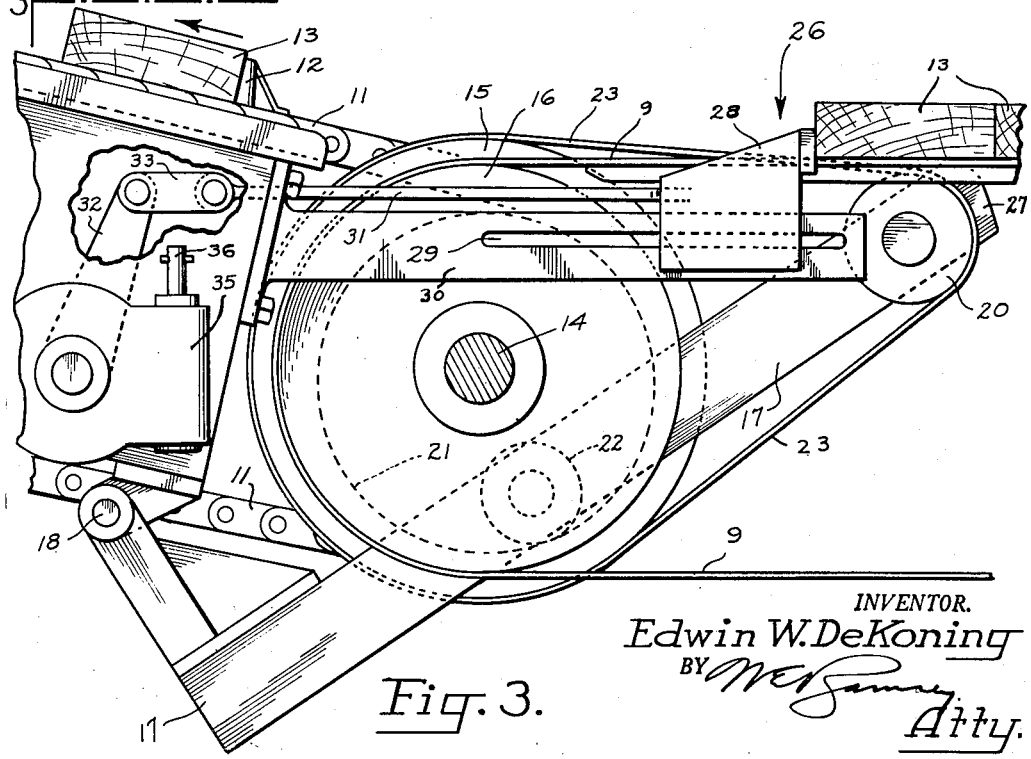
Fig. 3 is a side view, partially in section and partially broken away, taken substantially on the line 3—3 of Fig. 2, better to indicate the adjustment structure for the stop mechanism whereby various sized boards may be accommodated.

Correlating Fig. 1 to Figs. 2 and 3, one of the trimmer saw feed chains 11 conventionally is alive or is powered and the motivation thereof is transferred to the other feed chains via an elongated power shaft 14 which interconnects all the chains. With the instant invention, I provide a power pulley wheel 15 which is fixed to the power shaft 14 for rotation therewith. To one side of this power wheel (see Fig. 2) a second pulley wheel 16 also is fixed to the shaft 14 and each of the belts for the lumber feed belt system 9 is reeved over one of these latter pulley wheels. Accordingly, the movements and the speed of operation of all three mechanisms, namely the lumber transfer mechanism 8, the lumber feed belt system 9, and the trimmer saw system 10, are correlated one to another.

The lumber transfer mechanism per se includes an elongated lift arm 17 which is mounted beside the power wheel 15. This elongated arm has a first end which pivotally is mounted, as at 18, on a portion of the trimmer saw frame 19 and a second end upon which is journaled an idler pulley wheel 20. Thus, as the second end of the lift arm is moved up and down, by a cam and follower means or mechanism hereinafter to be described, the idler pulley wheel 20 also is moved up and down.

Returning to the details of the power wheel 15, one of these wheels is provided for each lumber transfer mechanism 8. Further, an eccentric circular cam surface 21 is recessed about the inner periphery of each wheel 15. In cooperation which this cam surface, a complementary follower wheel or means 22 is journaled intermediate the ends of the lift arm 17 so as to ride upon and mate with the cam surface 21. Thus, the eccentric motion of the cam surface 21 is impressed upon the follower 22 to generate a pivotal or reciprocating up and down motion at the second or free end of the lift arm 17.

The power pulley wheel 15 and the idler pulley wheel 20 are aligned one with another (see Fig. 2) and a continuous conveyor belt 23 is reeved about the peripheries thereof. This conveyor belt defines an upper carrying course and a lower return course. Further, a tray 24 is secured to each lift arm 17, as by cap screws 25. This tray underlies and supports the upper carrying course while a board is moving thereover. However, at this point, it should be noted that I employ the terms "belt" and "chain" interchangeably since I have found that they are equivalents in this inventive structure. Thus, where rough boards are transferred, chains may be employed and, where finished or planed lumber is handled, belts should be employed, all as will be recognized as desirable by those skilled in the art.

Again comparing Fig. 1 with Figs. 2 and 3, it will be seen that an adjustable stop mechanism 26 is mounted beside the upper carrying course of the conveyor belt 23 and is positioned to stop the boards 13 so a portion thereof directly overlies the second end of the lift arm 17. Further, this second end of the lift arm 17 terminates in or carries a bumper mechanism 27 which protrudes beyond the periphery of the idler pulley wheel 20. As an important feature of my invention, then, the stop mechanism 26 and the bumper mechanism 27 are spaced laterally one from another a distance which exceeds one half the width of a board in order that the bumper mechanism will rise to contact the board at a point located rearwardly of the center of mass of the board (see Fig. 5). To this end, with relation to boards of varying width the stop mechanism 26 is made adjustable by a structure now to be described.

Referring to Fig. 3, the stop mechanism 26 is provided with a stop plate member 28 having protruding flanges or the equivalent adapted slidably to cooperate with an elongated slot 29 formed in a support member 30. The support member 30, in turn, is pendent from the aforementioned trimmer saw frame 19. Further, an elongated rod 31 is connected, at one end, with the stop plate member 28 and, at the other end via a link 33, with an actuation lever 32. The actuation lever 32, in turn, is keyed to a shaft 34 for movement therewith. To rotate the shaft 34, any lever, worm gear, or equivalent system may be employed. However, I prefer to employ a worm and a follower mechanism which are enclosed in a housing 35 (see Fig. 3) and an input shaft of which protrudes as shown at 36. Thus, rotation of the input shaft 36 causes the entire housing 35 to rotate slowly, through the worm and follower mechanism, and to carry therewith the shaft 34. Rotation of the shaft 34, in turn, moves the actuation lever 32, the link 33, the rod 31, and the stop member 28 to the right or left as the case may be.

*Operation*

In use, the stop link 28 first is adjusted toward or away from the lumber feed belt system 9 in accord with the lateral width of the boards which are to be trimmed. That is to say (see Fig. 5) the bumper mechanism 27 must contact the under side of each of the boards 13 rearwardly of the center of mass thereof so the boards will tilt forwardly and contact the upper course of the conveyor belt 23. This contact point, in turn, is defined by the position of the stop mechanism 26 since the leading edge of each of the boards 13 is against the stop plate member 28 at the beginning of a cycle of operation.

Turning now to Figs. 4 to 7 inclusive, I have shown how the boards 13 are piled in tight, edge to edge, abutment against the stop mechanism 26 by the continuously moving lumber feed belt system 9. Further, I have shown how the first or leading board is picked up by the transfer mechanism 8, moved along, and deposited upon the feed chains 11 so the lugs 12 may carry the board to the trimmer saw system 10.

Sequentially, beginning with Fig. 4, the follower wheel 22 is riding on the low point of the cam surface 21 so the lift arm 17 defines a "lower position." In Fig. 5, on the other hand, the follower wheel 22 is riding over an intermediate portion of the cam surface 21 and the bumper 27 has been lifted vertically into contact with the under side of the first board 13. This movement, of course, is accommodated by the pivotal mounting 18 of the end of the lift arm.

At this point, it will be noted from Fig. 5 that the bumper 27 is contacting the board 13 at the critical point located rearwardly of the center of mass. At the same time, the rear edge of the board frictionally is sliding up past the next following board and the leading edge thereof frictionally is sliding up past the fixed stop mechanism 26. Continuing to Fig. 6, the follower wheel 22 there is riding over the highest point on the cam surface 21 so the lift arm 17 and bumper 27 define a "raised" or topmost position. In this position, the upper course of the conveyor belt 23 has been carried up over the top of the stop mechanism 26 so the leading board 13 is free to be pulled off of the bumper 27 by the conveyor belt and, thereafter, to be carried over the stop mechanism. The small arrows in Figs. 4 to 7 inclusive indicate the direction of movement of the boards and of the lift arm 17.

After the first or leading board 13 is transferred, via the conveyor belt 23, to the feed chains 11, the follower wheel 22 begins to descend to a lower point on the cam surface 21. This descent causes the bumper 27 and the lift arm 17 to move downwardly with the bumper 27 frictionally sliding past the leading edge of the next following board 13. At the same time, the upper course of the conveyor belt 23 once more is carried down below the stop mechanism 26 and the next following board is pushed ahead into engagement therewith as shown, in sequence, from Fig. 7 to Fig. 4, respectively. During all of this time, of course, the feed belt system 9 has been pushing upon all of the boards. Accordingly, each board moves ahead the moment it is free to do so.

The above described series of movements completes one cycle of operation and, in accord with my inventive objects, this cycle is correlated to the movement of the feed chains 11 so that one series of lugs 12 is brought into position during each cycle of operation. That is to say, the feed chains 11, the trimmer saw mechanism 8, and the lumber feed belt system 9 all are driven from the common power shaft 14 so that one rotation of the power wheel 15 and the cam surface 21 takes place each time a series of lugs 12 moves into position. This assures the loading of but one board on each lug if such a loading has been preselected by adjustment of the stop mechanism.

In summation, I have provided a lumber transfer mechanism which will separate the leading board from a pile or a plurality of edge to edge abutted boards, will lift this leading board free of the others, will move it laterally away from the remaining boards, and will deposit it at a final preselected point of use all without disturbing the remaining boards. Further, this lumber transfer mechanism can be manufactured at a minimal cost, it will operate at the high speeds required by the improved trimmer saws today available, and it can be adjusted in size, readily and quickly on the job, so as to handle various sizes of boards and types of lumber.

I claim:

1. A lumber transfer mechanism, comprising an aligned power wheel and idler wheel having spaced parallel axes of rotation and operatively carrying a continuous conveyor belt, an elongated lift arm arranged beside said power and idler wheels and having one end mounted for pivotal movement between a lower and a raised position, the other end of said arm carrying said idler wheel, a cam and follower means interconnecting said power wheel and lift arm to pivot the lift arm between said positions as the power wheel rotates, said other end of the lift arm defining a protruding bumper mechanism, and a stop member protruding above the surface of the upper course of said conveyor belt when said lift arm is in said lower position.

2. A lumber transfer mechanism, comprising a power wheel and an idler wheel having spaced parallel axes of rotation and having a continuous conveyor belt reeved over the peripheries thereof, said power wheel having a cam surface encompassing and eccentric with respect to the axis of rotation thereof, an elongated lift arm arranged beside said power and idler wheels, said elongated lift arm being mounted for pivotal movement between a lower and a raised position and carrying said idler wheel on the free end thereof, a follower means cooperating with said cam surface to pivot the said lift arm between said positions, and a stop mechanism protruding above the surface of the upper course of said conveyor belt when said lift arm is in said lower position.

3. A lumber transfer mechanism, comprising a power wheel and an idler wheel carrying a continuous conveyor belt, said power wheel having a cam surface encompassing and eccentric with respect to the axis of rotation thereof, an elongated lift arm arranged beside said power and idler wheels, one end of said elongated lift arm being mounted for pivotal movement between a lower and a raised position and the other end thereof carrying said idler wheel, a follower means carried intermediate the ends of said elongated lift arm and cooperating with said cam surface to pivot the said other end of the arm between said positions once during each revolution of said power driven wheel, said other end of the lift arm defining a protruding bumper mechanism, and a stop member protruding above the surface of the upper course of said conveyor belt when said lift arm is in said lower position, the upper course of said belt being raised above said fixed stop when said lift arm is pivoted to a raised position.

4. In a lumber transfer mechanism for use with a continuously moving feed belt, said feed belt being arranged to pile lumber up against the transfer mechanism in tight edge to edge abutment, said transfer mechanism being arranged to pick off the end piece without disturbing the other lumber and to transfer said end piece to a point of use, the improvement including first and second aligned wheel members having a continuous conveyor belt reeved thereover, a cam surface carried by said first wheel, an elongated lift arm mounted pivotally at one end and pendent from said second wheel at the other end, said arm carrying a cam follower means mated with said cam surface vertically to reciprocate said lift arm and second wheel in response to the rotation of said first wheel and cam surface, and a combined bumper and lift mechanism protruding beyond the periphery of said second wheel at the said other end of the lift arm.

5. In a lumber transfer mechanism for use with a continuously moving feed belt, said feed belt being arranged to pile boards up against the transfer mechanism in tight edge to edge abutment, said transfer mechanism being arranged to pick off the end board without disturbing the other boards and to transfer said end board to a point of use, the improvement including first and second aligned wheel members mounted for rotation about parallel axes and having a continuous conveyor belt reeved about the peripheries thereof, a cam surface carried by said first wheel, an elongated lift arm mounted pivotally at one end and pendent from said second wheel at the other end, said arm carrying a cam follower means mated with said cam surface vertically to reciprocate said lift arm and second wheel in response to the rotation of said first wheel and cam surface, a combined bumper and lift mechanism protruding beyond the periphery of said second wheel at the said other end of the lift arm, and a stop member spaced laterally from said lift mechanism a distance exceeding one half the width of a board, said conveyor belt and lift mechanism being movable vertically above said stop member to carry a board thereover.

6. In a lumber transfer mechanism, an off-bearing frame member carrying a power shaft, a power wheel joined to said shaft for rotation therewith, an elongated lift arm arranged on one side of said power wheel and having a first end pivoted upon said frame member with a second end extending laterally therefrom, an idler wheel journaled upon said second end and aligned with said power wheel, said second end carrying a bumper mechanism which protrudes beyond the periphery of said idler wheel to define a work engaging member, cam and follower means operatively interconnecting said power wheel and an intermediate portion of said arm to lift the said second end from a lower to a raised position and to lower the same back to the lower position once during each revolution of the power wheel, a continuous conveyor belt reeved over said power and idler wheels, and a stop member mounted laterally intermediate the frame member and said bumper on the opposite side of said power wheel from said arm.

7. In combination, an off-bearing frame member carrying a laterally elongated power shaft, a power wheel joined to said shaft for rotation therewith and carrying a cam surface on the inner periphery thereof, an elongated lift arm arranged on one side of said power wheel and having a first end pivoted upon said frame member with a second end extending laterally therefrom past said power wheel and under said shaft, an idler wheel journaled upon said second end and aligned with said power wheel, said two wheels having parallel axes of rotation, said second end carrying a bumper mechanism which protrudes beyond the periphery of said idler wheel to define a work engaging member, a follower wheel means carried intermediate the ends of said arm and mated with said cam surface to lift the second end of the arm from a lower to a raised position, a continuous conveyor belt reeved over said power and idler wheels and having an upper and a lower course with the upper course arranged substantially horizontal, and a stop member mounted laterally intermediate the frame member and said bumper on the opposite side of said power wheel from said arm, said stop member protruding vertically above the upper course of the belt when said arm defines said lower position, said upper course being movable vertically with said second end to a position higher than said stop member.

8. In combination with a plurality of spaced lumber feed belts and a plurality of spaced off-bearing chains having lugs thereon, all of said belts and chains being aligned laterally and being power driven from a common elongated shaft, a plurality of laterally spaced and aligned lumber transfer means intermediate the belts and chains for lifting individual boards one by one from the feed belts and depositing them upon the off-bearing chains, each said transfer means comprising; a power pulley wheel fixed to said common shaft for rotation therewith, an elongated lift arm carried beside said power wheel and having a first and a second end, said first end being pivotally mounted, said lift arm second end carrying an idler pulley wheel which is aligned with said power wheel, an eccentric cam surface carried by said power wheel, a complementary follower means carried intermediate the ends of said arm and operatively riding upon said cam surface to pivot said second end about said first end between a raised and a lower position, a conveyor belt reeved about said power and idler pulley wheels and having an upper and a lower course, said lift arm second end carrying a bumper which protrudes beyond the periphery of said idler wheel, and an adjustable stop member mounted beside the upper course of said conveyor belt.

9. In combination, an elongated power driven shaft, a plurality of laterally spaced and laterally aligned transfer mechanisms all driven in unison from said power shaft, each such mechanism including a power pulley wheel fixed to said shaft for rotation therewith, an elongated arm carried below said elongated shaft and extending longitudinally in a direction perpendicular the axis thereof, said arm having a first and a second end, said first end being pivotally mounted upon an axis located off-bearing of the axis of said shaft but parallel thereto, said second end carrying an idler pulley wheel which is aligned with said power wheel, an eccentric cam surface formed about the inner periphery of said power wheel, a complementary follower means carried intermediate the ends of said arm and operatively riding upon said cam surface to pivot said second end about said first end between a raised and a lower position, a conveyor belt reeved about said power and idler pulley wheels and having an upper and a lower course, said second end carrying a bumper having a lift surface which protrudes beyond the periphery of said idler wheel, and an adjustable stop member mounted beside the upper course of said conveyor belt, said stop member and lift surface being spaced apart a distance greater than the width of the work so the lift surface will engage the work on the feed side of the center of mass thereof, said upper course being carried below said stop member when said second end defines said lower position and being carried above said stop member when the second end defines said raised position.

10. In combination with a plurality of spaced lumber feed belts and a plurality of spaced off-bearing chains having lugs thereon, all of said belts and chains being aligned laterally and being power driven from a common elongated shaft, a plurality of laterally spaced and aligned lumber transfer means intermediate the belts and chains for lifting individual boards one by one from the feed belts and depositing them upon the off-bearing chains, each said transfer means including a power pulley wheel fixed to said common shaft for rotation therewith, an elongated arm carried beside said power wheel and having a first and a second end, said first end being pivotally mounted upon an axis located off-bearing of the axis of said shaft but parallel thereto, said second end carrying an idler pulley wheel which is aligned with said power wheel, an eccentric circular cam surface carried by said power wheel, a complementary follower means carried intermediate the ends of said arm and operatively riding upon said cam surface to pivot said second end about said first end between a raised and a lower position, a conveyor belt reeved about said power and idler pulley wheels and having an upper and a lower course, a tray mounted upon said arm and underlying and supporting said upper course, said second end carrying a bumper which protrudes beyond the periphery of said idler wheel, and an adjustable stop member mounted beside the upper course of said conveyor belt, said upper course being carried below said stop member when said second end defines said lower position and being carried above said stop member when the second end defines said raised position, said plurality of transfer means being correlated to the lugs on said off-bearing chains through the rotation of said common shaft so that one board is transferred to each series of lugs.

References Cited in the file of this patent

UNITED STATES PATENTS

| Number | Name | Date |
|---|---|---|
| 2,279,041 | Hadley | Apr. 7, 1942 |
| 2,313,478 | Neja | Mar. 9, 1943 |
| 2,357,631 | Coleman et al. | Sept. 5, 1944 |